UNITED STATES PATENT OFFICE.

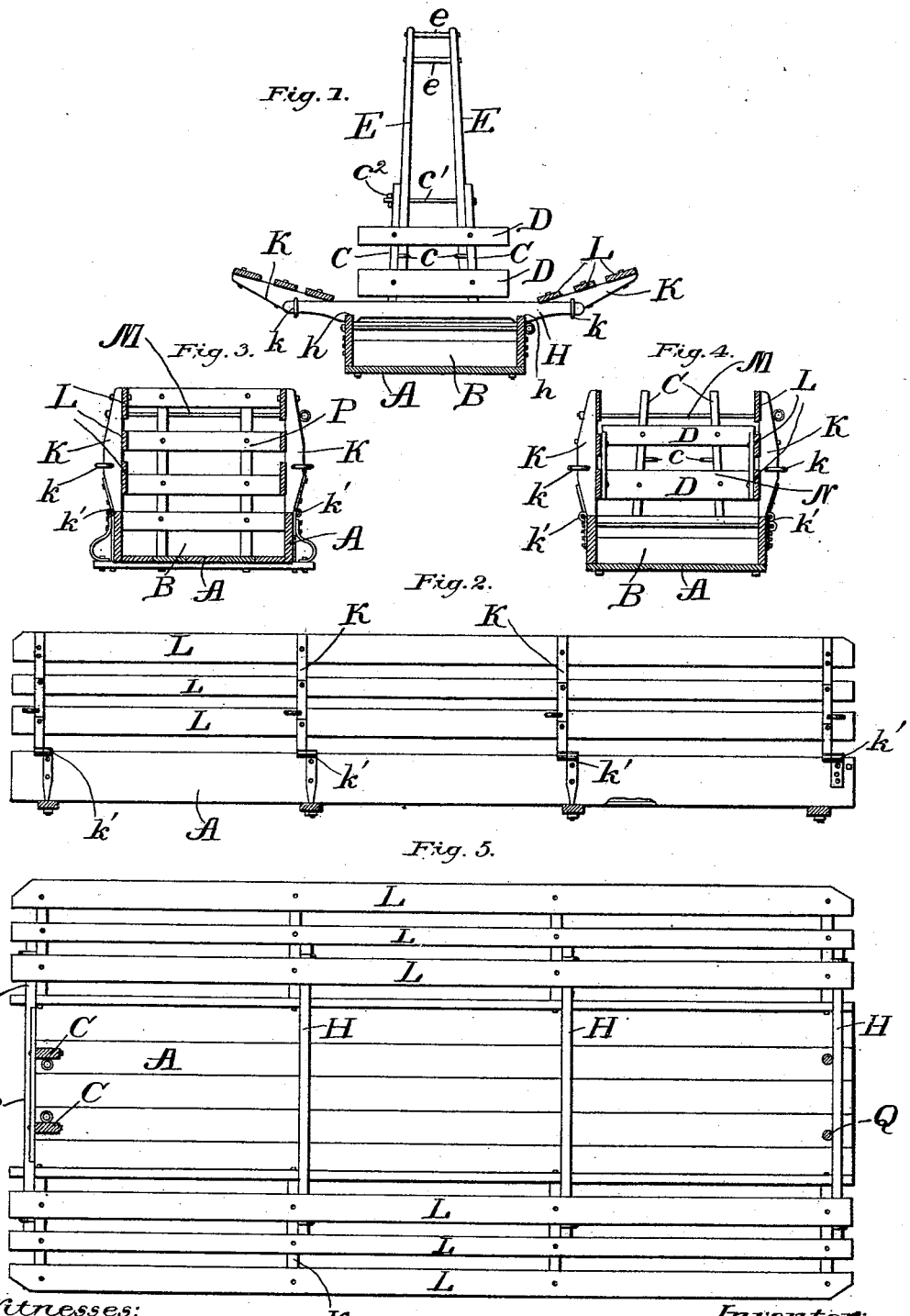

HIRAM CARTWRIGHT, OF OWATONNA, MINNESOTA.

COMBINED HAY AND STOCK RACK.

SPECIFICATION forming part of Letters Patent No. 495,106, dated April 11, 1893.

Application filed October 14, 1891. Serial No. 408,736. (No model.)

*To all whom it may concern:*

Be it known that I, HIRAM CARTWRIGHT, a citizen of the United States, residing at Owatonna, in the county of Steele and State of Minnesota, have invented a new and useful Combined Hay and Stock Rack, of which the following is a specification.

My invention relates to improvements in hay and stock racks, and lumber wagon boxes, whereby they are all combined in one implement; and the objects of my improvement are; first, to provide a strong, durable wagon box which can by the addition of certain attachments thereto, be easily and speedily converted into a hay rack for carrying hay; and, secondly to provide a lumber wagon box which can be easily and speedily converted into a stock rack for the purpose of carrying live stock by the addition and proper adjustment of certain attachments thereto. I attain the objects by the devices illustrated in the accompanying drawings in which similar parts are indicated by corresponding letters throughout the several views.

Figure 1 is a front view of my invention as adapted for use as a hay rack. Fig. 2 is a side view of my invention as adapted for use as a stock rack. Fig. 3 is a rear view of my invention as used for a stock rack. Fig. 4 is a front view of my invention as used for a stock rack. Fig. 5 is a plan view of my invention as used for a hay rack.

I construct a tight box A of the same dimensions and material as an ordinary lumber wagon box, except that the sides of the box are made of lumber about one and a half inches in thickness. The front end board B of this box is made stationary; and to this end board on the inside, I fasten securely two upright pieces of timber C, each about three feet in length. These cross pieces are fastened together by two transverse wooden slats as shown in Figs. 1 and 4 of the drawings. To the inside of each of these pieces of timber, and at about the center of each, I fasten a large iron staple $c$ with an opening or loop one and a half inches in diameter. Into the staples, I insert the lower ends of two other upright pieces E, which fit between the two lower uprights and extend upward about five feet and which are fastened together near their tops by two small cross pieces $e$ as shown in Fig. 1 of the accompanying drawings. These two upright pieces are held in a perpendicular position by an iron rod $c'$ which passes through the ends of the lower and upper pieces near the upper end of the former, the rod being held in place by a key $c^2$ as shown in said Fig. 1 of the accompanying drawings.

Across the top of the box I place, at equal distance from each other, four pieces of timber H about five feet in length and which are held in position on the top of the box by notches as shown in Fig. 1. The ends of these cross pieces are fastened (by passing into large iron staples $k$, as shown in Fig. 1) to short projecting arms K which are hinged at $k'$ to the top of the box. These short arms K (preferably four in number on each side of the box) are so fastened to the cross pieces by the staples that they stand at a slight incline toward the box as shown in Fig. 1. On the top of each set of frames, I nail boards L running lengthwise of the rack and construct any convenient form of end gate such as Q, in Fig. 5, for the rear end of the rack thus making a hay rack complete. The hinges $k'$ at the top of the box are made separable so that by shifting the arms K composing the sides a little toward the rear and slipping the cross pieces H out of the staples, the sides become unhinged and can be removed leaving a wagon box A ready for use. By slipping the cross pieces H out of the staples $k$, taking said cross pieces off and turning the sets of arms composing each side of the rack upward until they stand in a perpendicular position, a stock rack is formed, the sides of which are held together by rods M passing through their ends and through the end gates N and P. My invention as thus arranged is a rack for carrying live stock.

Being aware that combined hay and stock racks, and also combined wagon boxes and hay racks, are not new inventions, I do not claim a patent on such broadly, but What I do claim, and desire to secure by Letters Patent of the United States, is—

1. A wagon box provided with movable cross pieces extending across the top thereof, the ends of which are fastened by means of staples, to short arms hinged to the top of the box on each side thereof, and projecting from it in an inclined position, and to which are fastened boards or slats extending lengthwise of the box, the whole forming a hay rack, substantially as described.

2. A wagon box with a stationary front end board, to the inside of which are fastened two upright pieces of timber secured to each other by transverse wooden slats and having large staples in the upper end of each, into which staples are fitted the lower ends of said upright pieces and the said upright pieces being fastened together near their upper ends with cross pieces and bolts, the box above described having movable cross pieces extending across the top thereof, short arms fastened by means of staples to said cross pieces, and hinged on the top of the box on each side and projecting from it in an inclined position, and boards or slats running lengthwise of the box, fastened to said short arms, the whole forming and to be used as a hay rack, as described.

3. A wagon box with stationary front end board to the inside of which are fastened two upright pieces of timber secured to each other by transverse wooden slats with large iron staples in the upper end of each and on the inner side, into which staples are fitted the lower ends of two more upright pieces fastened together near their upper ends by cross pieces and bolts, the wagon box above described having movable cross pieces extending across the top of it, the ends of which are fastened by means of iron staples, to short arms hinged on to the top of the box on each side and projecting from it in an inclined position and to which are fastened long boards or slats running lengthwise of the box, the hinges being separable so that the arms on each side of the rack may be removed leaving a wagon box or by raising them up to a perpendicular position and slipping the cross pieces out of the staples and removing them, a stock rack is formed the sides of which are held in position by rods passing through their ends and through the end gates, substantially as set forth.

HIRAM CARTWRIGHT.

Witnesses:
E. W. RICHTER,
A. J. TRUESDEN.